United States Patent [19]

Hideaki

[11] Patent Number: 4,985,849

[45] Date of Patent: Jan. 15, 1991

[54] IMAGE PROCESSING SYSTEM FOR FORMING A SLANTWISE-MAPPED OR ROTATED MODIFIED IMAGE OF AN ORIGINAL IMAGE

[75] Inventor: Kawamura Hideaki, Kawasaki, Japan

[73] Assignee: Canon Kabushiki Kaisha, Tokyo, Japan

[21] Appl. No.: 204,598

[22] Filed: Jun. 9, 1988

[30] Foreign Application Priority Data

Jun. 12, 1987 [JP] Japan .................................. 62-146733
Nov. 10, 1987 [JP] Japan .................................. 62-282261

[51] Int. Cl.⁵ .............................................. G06F 15/62
[52] U.S. Cl. .................................................. 364/518
[58] Field of Search ................ 364/518, 754; 340/723, 340/727, 747, 799; 382/46, 44

[56] References Cited

U.S. PATENT DOCUMENTS

| | | | |
|---|---|---|---|
| 4,566,075 | 1/1986 | Guttag ................................ | 364/754 |
| 4,611,232 | 9/1986 | Searby .............................. | 382/46 X |
| 4,672,680 | 6/1987 | Middleton ........................ | 382/46 X |
| 4,718,024 | 1/1988 | Guttag et al. .................... | 340/747 X |
| 4,727,365 | 2/1988 | Bunker et al. ................... | 340/747 X |
| 4,790,025 | 12/1988 | Inoue et al. ...................... | 382/46 X |
| 4,799,182 | 1/1989 | Marwood ........................ | 364/754 X |
| 4,839,847 | 6/1989 | Laprade ............................ | 364/754 |
| 4,850,028 | 7/1989 | Kawamura ......................... | 382/46 |

OTHER PUBLICATIONS

Blaauw et al, IBM Technical Disclosure Bulletin, vol. 4, No. 11, Apr. 1962.

Primary Examiner—Dale M. Shaw
Assistant Examiner—Mark K. Zimmerman
Attorney, Agent, or Firm—Fitzpatrick, Cella, Harper & Scinto

[57] ABSTRACT

An image processing apparatus for forming a modified image from an original image, in which addresses for the modified image are calculated, and corresponding addresses of the original image are calculated, both sets of calculations being performed in such a manner that a substantial amount of the data needed for the calculations is prestored in a look-up table or the like. In addition, the calculations are carried out in such a manner as to reduce the number of multiplications and divisions (versus additions) which must be performed, to increase calculation speed.

13 Claims, 13 Drawing Sheets

| n | CS (n)<br>(n·cos α) | SN (n)<br>(n·sin α) |
|---|---|---|
| 0 | 0 | 0 |
| 1 | cos α | sin α |
| 2 | 2·cos α | 2·sin α |
| 3 | 3·cos α | 3·sin α |
| 4 | 4·cos α | 4·sin α |
| ⋮ | ⋮ | ⋮ |
| MAX | MAX·cos α | MAX·sin α |

| n | $OFX_1(n)$ | $OFY_1(n)$ |
|---|---|---|
| 0 | 0 | 0 |
| 1 | 1 | a |
| 2 | 2 | 2·a |
| 3 | 3 | 3·a |
| ⋮ | ⋮ | ⋮ |
| $x_2' - x_1'$ | $x_2' - x_1'$ | $y_2' - y_1'$ |

FIG. 5

| n | $OFY_2(n)$ | $OFX_2(n)$ |
|---|---|---|
| 0 | 0 | 0 |
| 1 | 1 | b |
| 2 | 2 | $2 \cdot b$ |
| 3 | 3 | $3 \cdot b$ |
| ⋮ | ⋮ | ⋮ |
| $y_3' - y_1'$ | $y_3' - y_1'$ | $x_3' - x_1'$ |

54c

1st TABLE

| n / TABLE ADDRESS | OFX1(n) : $x'-x'_1$ | OFY1(n) : $y'-y'_1$ |
|---|---|---|
| 0 | 0 | 0 |
| 1 | 1 | $\dfrac{y'_2 - y'_1}{x'_2 - x'_1}$ |
| 2 | 2 | $\dfrac{y'_2 - y'_1}{x'_2 - x'_1} \times 2$ |
| 3 | 3 | $\dfrac{y'_2 - y'_1}{x'_2 - x'_1} \times 3$ |
| ------ | ------ | ------ |
| $x'_2 - x'_1$ | $x'_2 - x'_1$ | $y'_2 - y'_1$ |

2nd TABLE

| n / TABLE ADDRESS | OFX2(n) : $x'-x'_1$ | OFY2(n) : $y'-y'_1$ |
|---|---|---|
| 0 | 0 | 0 |
| 1 | $\dfrac{x'_3 - x'_1}{y'_3 - y'_1}$ | 1 |
| 2 | $\dfrac{x'_3 - x'_1}{y'_3 - y'_1} \times 2$ | 2 |
| 3 | $\dfrac{x'_3 - x'_1}{y'_3 - y'_1} \times 3$ | 3 |
| ------ | ------ | ------ |
| $y'_3 - y'_1$ | $x'_3 - x'_1$ | $y'_3 - y'_1$ |

○ ------ COPIED POINTS
× ------ LOOKING POINTS

IMAGE PROCESSING SYSTEM FOR FORMING A SLANTWISE-MAPPED OR ROTATED MODIFIED IMAGE OF AN ORIGINAL IMAGE

BACKGROUND OF THE INVENTION

1. Field of the Invention

The present invention relates to an image processing apparatus which forms modified images from original images.

2. Brief Description of the Related Art

An image processing apparatus which performs magnification (enlargement or reduction), rotation, affine conversion or slantwise mapping of an original image is well known. For example, affine conversion is to perform, simultaneously, magnification, rotation, and shifting of the original image. Slantwise mapping is to convert a rectangular original image into an image having the shape of a non-rectangular parallelogram.

In such a modification or conversion, calculations of addresses are necessary. These calculations are very complicated and involve multiplications and divisions, so that it takes a relatively long time to obtain the necessary addresses.

Further, it takes several times, or even dozens of times, as long for the micro processor to perform a multiplying process as to perform an adding or reducing process. Namely, the more the multiplying processes, the longer the operation time.

In the conventional method, operations for calculating original addresses and destination addresses have some multiplying processes so that it takes much time to form the modified images, e.g., a rotated image.

SUMMARY OF THE INVENTION

The object of the present invention is to overcome the above-mentioned shortcomings of the conventional image processing apparatus.

According to the present invention, the image processing apparatus calculates easily and very fast what is necessary to modify the original image.

More specifically, one aspect of the present invention comprises a first memory for storing data to calculate modified addresses of the modified image, a second memory for storing data to calculate original addresses of the original image corresponding to the addresses of the modified image, and transferring or copying means for transferring image data of the original address to the modified address.

By virtue of the above mentioned feature, the image processing apparatus is able to modify, e.g., rotating, slantwise mapping or magnifying, easily and very fast.

There have thus been outlined rather broadly some of the more important features of the invention in order that the detailed description of the preferred embodiment thereof that follows may be better understood, and in order that the present contribution to the art may be better appreciated. There are, of course, additional features of the invention that will be described in that detailed description and the accompanying drawings. Those skilled in the art will appreciate that the conception upon which this disclosure is based may readily be utilized as a basis for designing other structures or methods for carrying out the purposes of the invention. It will be understood that the claims are to be regarded as including such other constructions and methods as do not depart from the spirit and scope of the invention.

BRIEF DESCRIPTION OF THE DRAWINGS

FIG. 3 is a chart illustrating contents of a first table 54a.

FIG. 4 is a chart illustrating contents of a second table 54b.

FIG. 5 is a chart illustrating contents of a third table 54c.

FIG. 13(2) is a chart illustrating contents of a third and a fourth table.

DETAILED DESCRIPTION OF THE PREFERRED EMBODIMENTS

In the first embodiment, the rotation of the original image is performed, and the original image and the copied rotated image are expanded or stored in the same VRAM (Video Random Access Memory).

Figure 1:
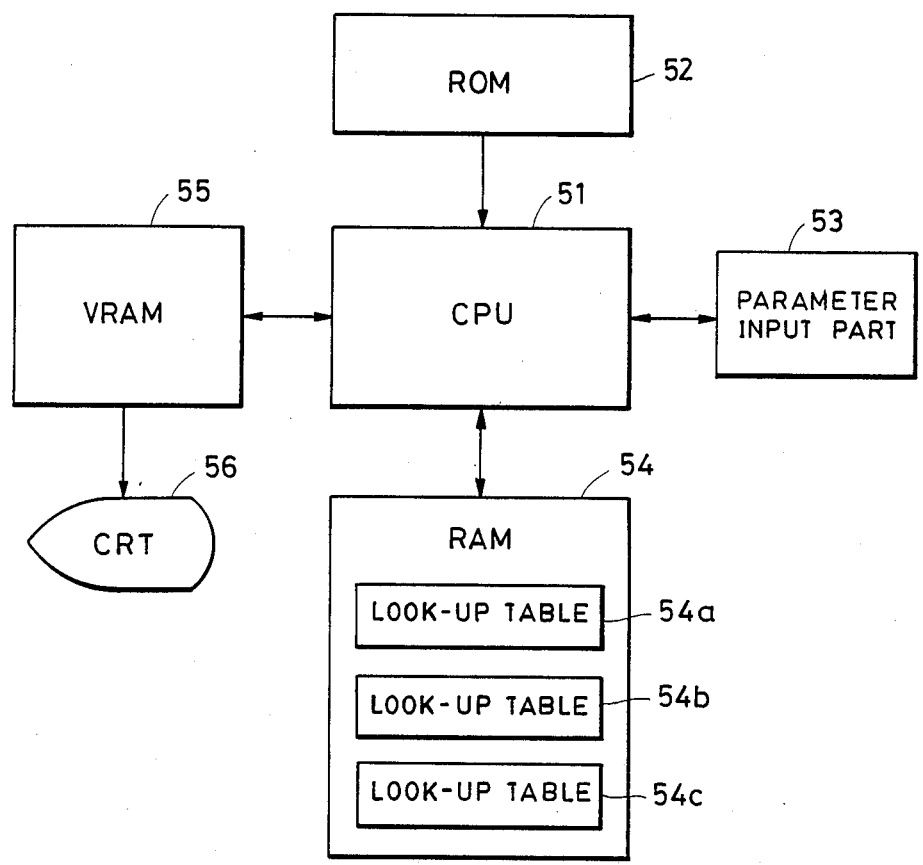
FIG. 1 is a block diagram of the first embodiment of the present invention.

The Structure of the First Embodiment (FIG. 1)

FIG. 1 is a block diagram of the image processing apparatus of the first embodiment.

In FIG. 1, a CPU 51 controls the whole apparatus according to a program (FIG. 6) stored in a ROM 52.

A parameter input part 53 is provided for inputting parameters pertaining to the image modification to be performed, for example, angle of the rotation of the image. The input part 53 can, for example, comprise a pointing device for setting a region to be rotated and a keyboard for inputting the angle addresses, magnifications, etc. A RAM 54 is provided to be used as a working area by the CPU 51, and has a capacity sufficient to store look-up tables 54a, 54b and 54c which are described hereinafter. A VRAM 55 is provided for storing the original image and a modified or rotated original image, for displaying the stored images on a display apparatus 56. More specfically, in this embodiment, a screen of the display apparatus 56 coincides to a memory area of the VRAM 55.

Figure 2:
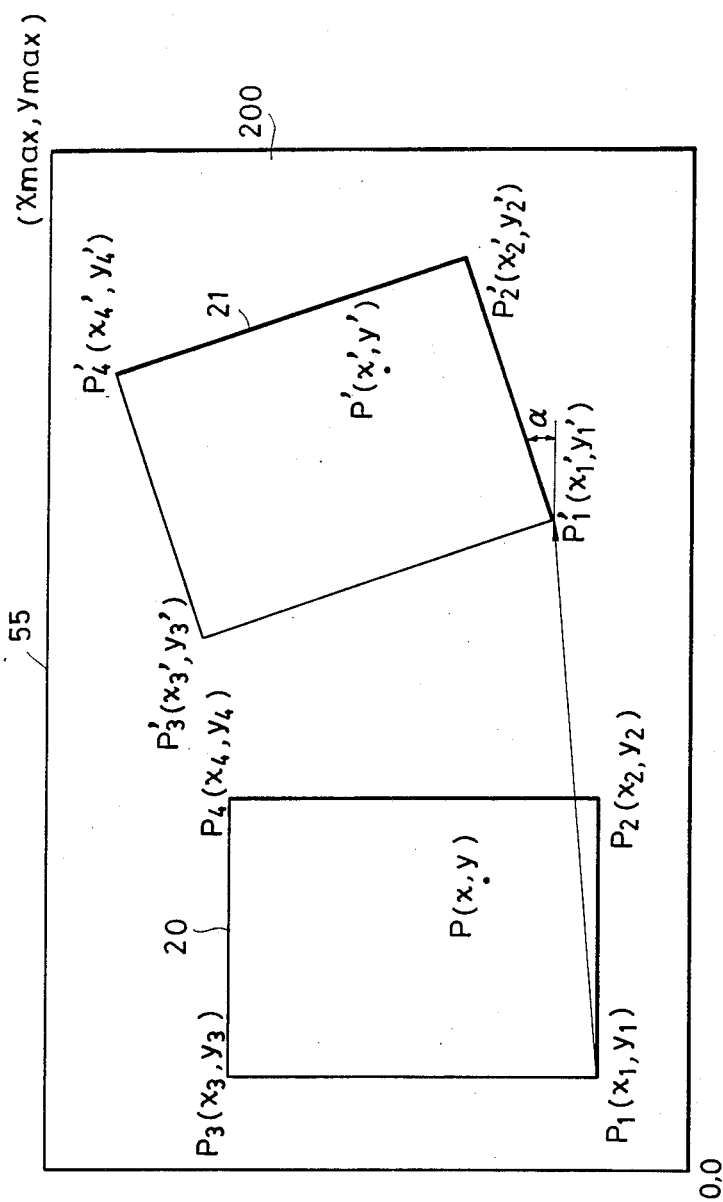
FIG. 2 is a drawing for explaining processings of an image rotation.

The Principle of the Image Rotation (FIG. 2.)

FIG. 2 shows contents of the VRAM 55. In this case, an original image of a rectangular region 20 defined by corner points P1-P4, is rotated by a rotation angle α and copied to a rotated image of a rectangular region 21 defined by corner points P1'-P4'. In FIG. 2, the corner point P1 of the region 20 is shifted parallel to the point P1' of the region 21, and then is rotated by the angle α, where the point P1' is the central point of rotation.

Two conventional methods for rotating the original image by the angle α to get a rotated output image, are known as follows.

I. An output address on the output image which corresponds to a given original pixel of the original image is obtained. Then image data of the original pixel is copied to the output address. These processes are done for all original pixels of the original image.

II. An original address on the original image which corresponds to a given output pixel of the output image is obtained. Then the image data of the original address is copied to an output address of the output pixel. These processes are done for all output pixels of the output image.

These two methods are substantially the same. However, when the output image is expanded to a scattered area, such as a semiconductor memory or digital memory, method II should be selected. If method I is selected, many lacking pixels are likely to be generated on the output image because the pixels in the digital memory are separated and scattered as in a lattice.

The principle for forming the output image is described as follows:

As described above, the region 21 including the output image is obtained by rotating the original image by the rotating angle α.

Now, the rotating angle α is assumed to be set as an inclination of a side P1P2 and is less than 1, (i.e., the inclination equals 1 when the angle α is 45 degrees) assuming that a switch of pixels in the vertical axis is the same as that in the horizontal axis on the display screen.

First, relations between the output addresses on the sides P1'P2' and P1'P3' and original pixels corresponding to the output addresses are determined. Then a reference point of a line parallel to the side P1'P2' is sequentially and gradually shifted to the output address on the side P1'P3'.

If the inclination of the side P1'P2' is more than 1, relations between the output addresses on the sides P1'P2' and P1'P3' and the original pixels corresponding to the output pixels are determined as well as the case mentioned above. Then a reference point of a line parallel to the side P1'P3' might be sequentially and gradually shifted to the output address on the side P1'P2'. Therefore, it does not substantially matter whether the inclination of the side P1'P2' is less than 1 or not.

Explanation of the Look-Up Tables 54a-54c (FIGS. 2 to 5)

In FIG. 2, the relation between any output point P' (Px', Py') in the region 21 and an original point P (Px, Py) corresponding to the output point P' (Px', Py') can be represented as follows:

$$Px = x_1 + \cos \alpha \cdot (P_{x'} - x_1') + \sin \alpha \cdot (P_{y'} - y_1') \quad (1)$$

$$Py = y_1 - \sin \alpha \cdot (P_{x'} - x_1') + \cos \alpha \cdot (P_{y'} - y_1') \quad (2)$$

where $$\cos \alpha = \frac{x_2' - x_1'}{\sqrt{(x_2' - x_1')^2 + (y_2' - y_1')^2}} \quad (3)$$

and $$\sin \alpha = \frac{y_2' - y_1'}{\sqrt{(x_2' - x_1')^2 + (y_2' - y_1')^2}} \quad (4)$$

Cos α and sin α may treated as be constants, so that cos α and sin α can be calculated once for the rotation to be effected, and need not be calculated every time the original addresses Px and Py are calculated. As a result, the original addresses are calculated very fast.

However, if cos α and sin α are dealt with as constants, multiplications are necessary to get the original addresses.

Now, equations (1) and (2) are decomposed as follows:

$$P_x = P_{x'} \cdot \cos \alpha + P_{y'} \cdot \sin \alpha + \quad (1')$$
$$(x_1 - x_1' \cdot \cos \alpha - y_1' \cdot \sin \alpha)$$

$$P_y = P_{y'} \cdot \cos \alpha + P_{x'} \cdot \sin \alpha + \quad (2')$$
$$(y_1 - x_1' \cdot \sin \alpha - y_1' \cdot \cos \alpha)$$

In equations (1') and (2'), x1', x1, y1', y1, cos α and sin α are all constants, so that the portions of these equations in parentheses are also constants.

Px' and Py' are addresses in the VRAM 55, and therefore the maximum values of Px' and Py' cannot excede the maximum addresses (Xmax, Ymax) of the VRAM 55. Also, Px and Py are integers. Therefore, assuming that Xmax is more than Ymax and letting MAX stand for Xmax, the values of Px' and Py' must each be less than MAX+1. Because of these constraints Px'·cos α and Py'·cos α can only assume the following values: 0·cos α, 1·cos α, 2·cos α, . . . , MAX·cos α.

Similarly, Px'·sin α and Py'·sin α are limited to the following values: 0·sin α, 1·sin α, 2·sin α, . . . , MAX·sin α.

This is, the coefficients of sin α and of cos α also do not excede MAX+1.

Then, as shown in FIG. 3, the calculated values 0·sin α through MAX·sin α are stored in look-up table 54a as SN(n), and the calculated values 0·cos α, through MAX·cos α are also stored in the table 54a as CS(n). Therefore, the original addresses are calculated using equations (1) and (2), entirely by simple adding and reducing operations and without any multiplication.

Before actual processing for rotation is started, relative addresses OFX1(n) and OFY1(n) of all points on the side P1'P2' to the point P2' are stored in look up table 54b, whose contents are shown in FIG. 4. In FIG. 4, coefficient "a" is:

$$a = \frac{y_2' - y_1'}{x_2' - x_1'}$$

where $x_2' > x_1'$.

Similarly, relative addresses OFY2(n) and OFX2(n) of all points on the side P1' P3' to the point P1' are stored in look-up table 54c whose contents are shown in FIG. 5.

Figure 6:
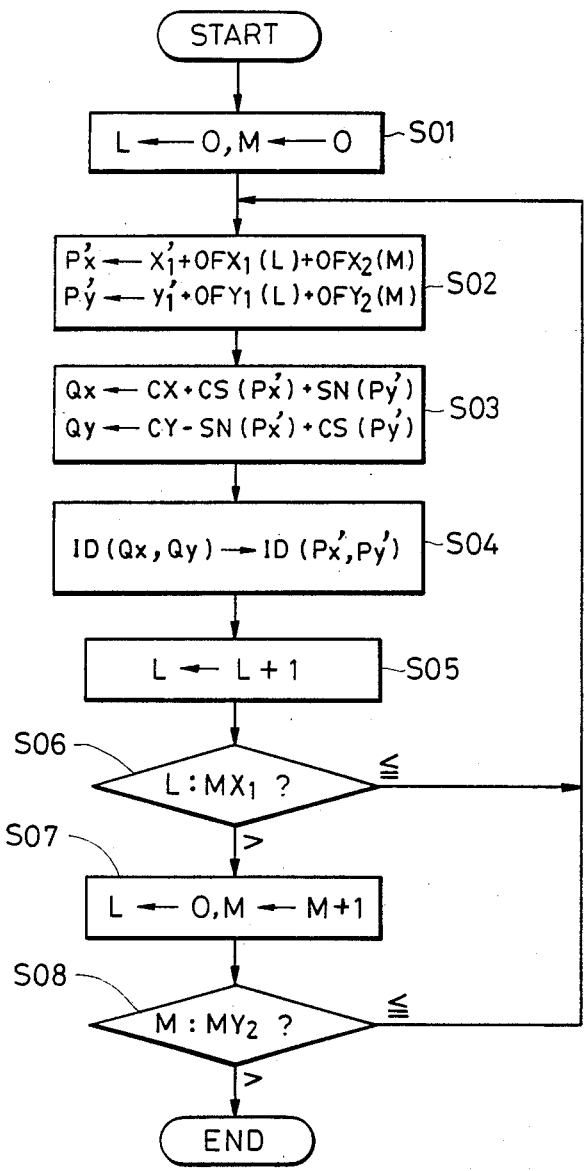
FIG. 6 is a flow chart illustrating procedures of a CPU.

Explanation of the Processing of the Rotation (FIG. 6)

The explanation of the actual processing of the rotation is as follows:

In this explanation, the constant in equation (1') (the portion in parentheses) is written as CX:

$$CX = x_1 - x_2 \cos \alpha - x_1' \sin x$$

Similarly, the constant in equation (2') (the portion in parentheses) is written as CY:

$$CY = y_1 x_1' \sin \alpha - y_1' \cos x$$

And $(x_2' - x_1')$ and $(y_2' - y_1')$ are written as MX1 and MX2:

$$MX1 = x_2' - x_1'$$

$$MY1 = y_3' - y_1'$$

As mentioned above, in this embodiment, the output addresses P'(Px', Py') on the sides P1'P2' and P1'P'3 are determined first. Then the original address Q (Qx, Qy) which corresponds to the output address P'(Px', Py') is calculated. The image data at the original address Q is transferred or copied to the output address P'(Px', Py').

These processings are repeatedly carried out for all points on the side P1'P2' from point P1' to point P2'. Then the reference point is shifted from point P1' to another point which is adjacent to point P1' on side P1'P3', and the processed line is shifted from side P1'P2' while being maintained parallel to the latter line. The processings mentioned above are repeatedly carried out for the line parallel to side P1'P2'. The rotated image is completed when the processings for side P3'P4' are finished. In this embodiment, calculated values CX, CY, MX1, and MY1 and the stored values in tables 54a, 54b and 54c are used for getting the addresses P' and Q using only adding and reducing operations, without multiplication.

The output address P' (Px', Py') is represented as follows using the calculated values and the values stored in the tables 54a, 54b and 54c:

$$Px' = x_1' + OFX1(L) + OFX2(M) \quad (5)$$

$$Py' = y_2' + OFY1(L) + OFY2(M) \quad (6)$$

The corresponding original address Q(Qx, Qy) is represented as follows using results from equations (5) and (6), the calculated values and the stored values:

$$Qx = CX + CS(Px') + SN(Py') \quad (7)$$

$$Qy = CY + SN(Px') + CS(Py') \quad (8)$$

In equations (5) and (6), "M" stands for the number of the parallel lines where the processings are currently being carried out, and "L" stands for the number of the points where the processings are being carried out.

As shown in equations (5), (6), (7) and (8), there is no multiplication in these processings, and these equations involve only adding and reducing operations which can be performed very fast. Therefore, the rotated image can be obtained from the original image very fast.

Based on the flow chart of FIG. 6, operations of the CPU 51 according to the equations cited above are explained as follows. In this case, the calculated values CX, CY, MX1 and MY1 and the values stored in tables 54a, 54b and 54c are assumed to have been calculated and stored in advance.

In step S01, 0 is assigned as the initial value of variables L and M. In step S02, using equations (5) and (6), which are made up of adding and reducing operations, Px' and Py' are respectively calculated.

In step S03, according to values Px' and Py' obtained in step S02, the original addresses Q(Qx, Qy) are calculated by using equations (7) and (8). Then, in step S04, the image data ID(Qx, Qy) of the original address Q is transferred or copied to the output address P'.

In step S05, the variable L is incremented. In step S06, the variable is compared to the constant MX1, if the variable L is no more than constant MX1, i.e., $L \leq MX1$, the process of the CPU 51 is returned to step S02 because the processing for one line is not yet complete. And, steps S02 through S06 are repeatedly carried out until the processing of one line is completed.

If the processing for one line is complete, the variable L is reset to the initial value "0", and the variable M is incremented by 1 in order to start the processing of the next line (step S07).

In step S08, the incremented variable M is compared to the constant MY2. If the variable M is no more than the constant MY2, the processing of the rotation is completed for all points of the output addresses.

As mentioned above, owing to the arrangement of this embodiment, the rotated image is obtained very fast and easily.

Figure 7:
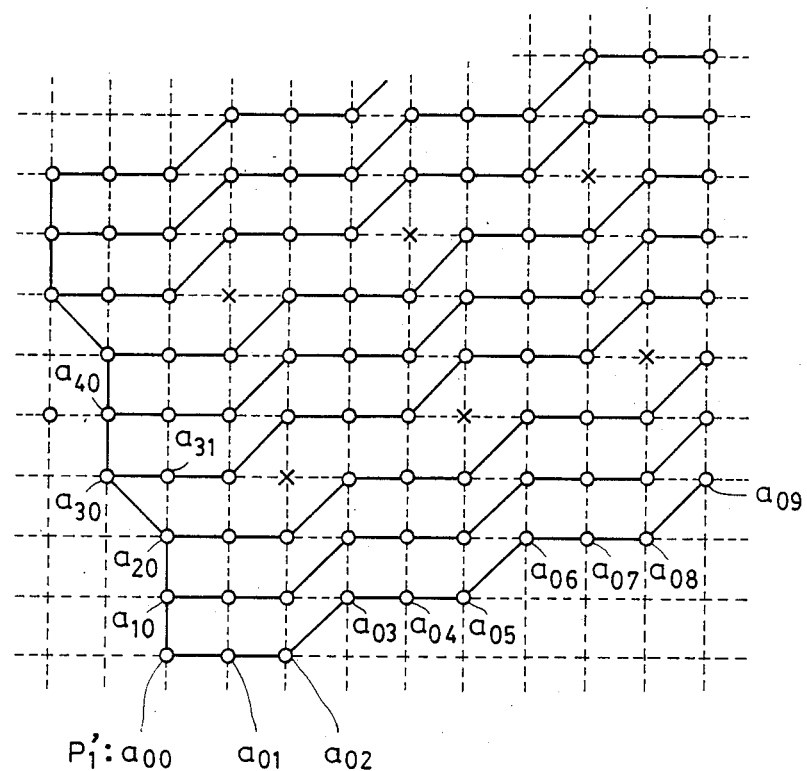
FIG. 7 is a drawing for explaining generation of lacking pixels.
Figure 8:
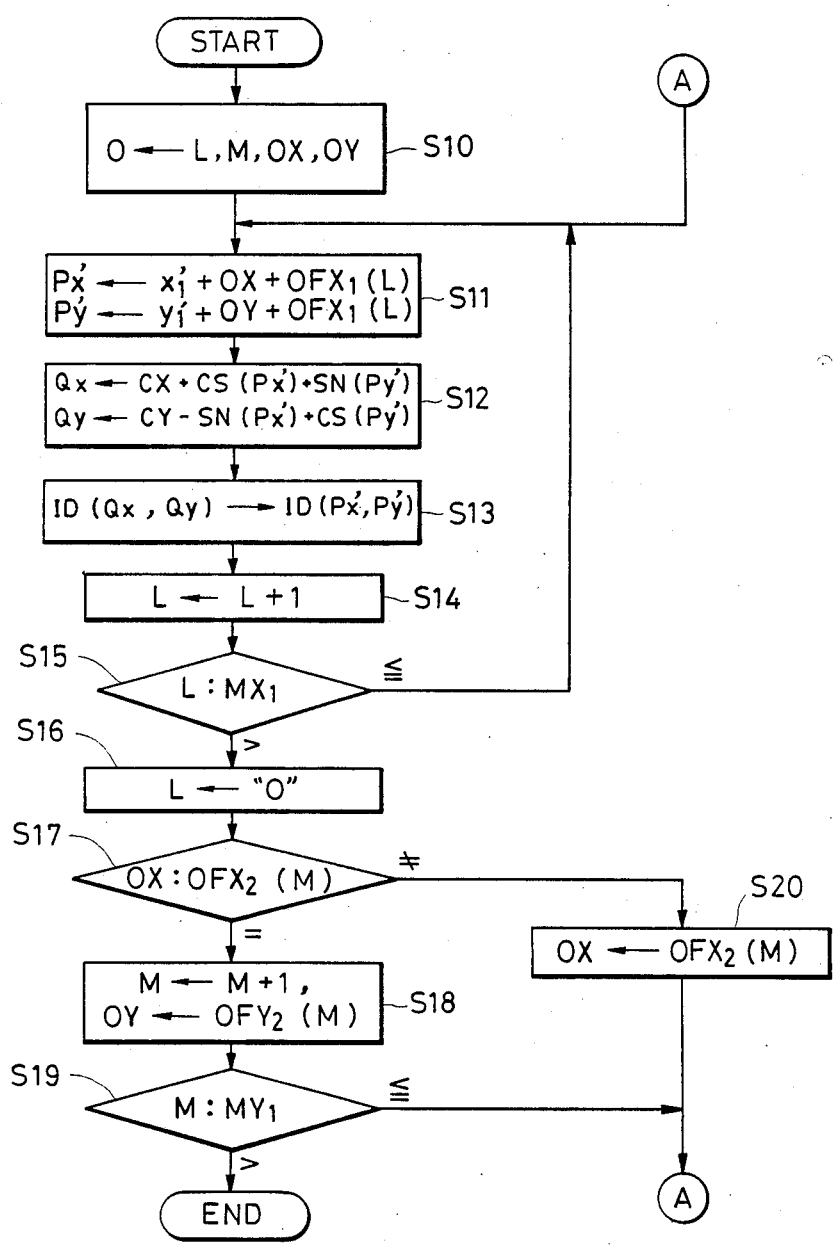
FIG. 8 is a modified version of the flow chart shown in FIG. 6.
Figure 9:
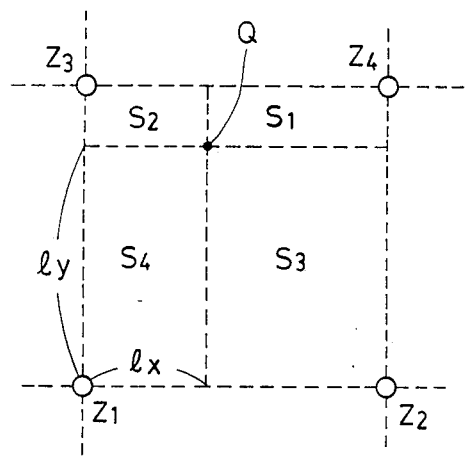
FIG. 9 is a drawing for explaining an interpolation method.

Explanation of the Modified Embodiment (FIGS. 7 to 9).

For example, in the first embodiment, if the inclination of side P1P2 or the rotation is set to "⅓", an arrangement of the rotated output image is displayed as shown in FIG. 7. In FIG. 7, the point P1' is displayed as a point a00.

As shown in FIG. 7, it is understood that some output pixels (shown there as "X") are lacking from the output image.

Such lacking pixels occur when the reference point is shifted to an adjacent inclined pixel, as for example the reference point a20 to the point a30.

In other words, the output point addresses P do not cover all points in the output region using only the process illustrate in the flow chart shown in FIG. 6.

In order to prevent the occurrence of such gaps or lacking pixels, a process illustrated in the flow chart shown in FIG. 8 is provided, the flow chart in FIG. 8 being an improved modification of the flow chart in FIG. 6. The principle of the flow chart in FIG. 8 is described before the explanation of the operation of the process.

The output addresses (Px', Py') of the lacking pixels indicated as "X", must be calculated. Once the addresses are obtained, the original addresses Q can be calculated by using equations (7) and (8). Therefore, it should be determined in which cases it is necessary to calculate the output addresses of the lacking pixels.

Now, as mentioned above, whether the α addresses of the former and the next reference points (e.g., the pixels a20 and a30) are different by "1" or not is determined. In other words, it is ascertained whether the address of the reference point is shifted by moving figure of a small number or not. If the α address is shifted, a temporary reference point is assumed to be set at a point a31 adjacent to the real reference point a30.

Processing for one line is carried out from the temporary reference point a31. After the processing for the line is completed, processing of the same one line is carried out from the real reference point a30. The points on the line other than the points displayed as "X" are processed twice.

Based on the principle described above, the operation of the flow chart shown in FIG. 8 is as follows.

In step S10, the variables L, M, OX and OY are initialized to "0". In step S11, the output address (Px', Py') is calculated by equations (5') and (6'):

$$Px' = x_1' + OX + OFX1(M) \qquad (5')$$

$$Py' = y_1' + OY + OFX1(M) \qquad (6')$$

In step S12, the original address (Qx, Qy) is calculated by equations (7) and (8) as well as the step S03 of the flow chart in FIG. 6. In step S13, the image data at the original address (Qx, Qy) is transferred or copied to those at the output address (Px', Py'). Then, in step S14, the variable L is incremented by 1.

In step S15, the variable L is compared to the constant MX1, which is the same process as the step S06 in FIG. 6. Steps S11 through S15 are repeatedly carried out until the variable L exceeds the constant MX1 (L>MX1), i.e., until the rotation processing of one line is completed.

After the processing of the one line is completed, the variable L is reset to "0" in step S16. Then, in step S17, it is determined whether the variable OX is equal to the variable OFX2(M) or not.

If M is equal to OFX2(M), that is, if the $\alpha$ address of the next reference point is not shifted, the variable M is increment by 1 and the variable OY is changed or renewed to the value of OFY2(M) in step 18.

The incremented variable M is compared to the constant MY1 in step S19. If the variable M is no more than MY1 (M≦MY1), the process of the CPU 51 is returned to step S11. If M is more than MY1 (M>M1), the rotation processing of the CPU 51 is terminated.

In the processings mentioned above, while the processing proceeds from S16 to S17 to S18, the $\alpha$ addresses of the reference points are not changed nor shifted a00→a10→a20 (see FIG. 7).

When the processing of the one line whose reference point is point a20 is completed, the processing of the next line is started from point a31. During the processing of the next line including point a31, it is determined in step S17 that the variable OX is not equal to the variable OFX2(M) (because the variable OFX2(M) means the $\alpha$ address of point a30 at this time). Then the variable OX is changed to the variable OFX2(M) in step S20, but the variable OY is not changed.

Therefore, at this time the processing for the same line is carried out from the real reference point a30.

As described above, the processing of a predetermined line is carried out twice, so that lacking pixels do not occur in the output image.

In this embodiment, the inclination of the side P1'P2' or the rotation is assumed to be limited to values from 0 to 1. However, the invention is not so limited. If the inclination is more than 1, the rotation processing can be completed by exchanging the $\alpha$ axis and the y axis for each other.

Further, in this embodiment, the stored values of CS(n) and SN(n) in look-up tables 54a, 54b and 54c are assumed to be limited to integers, i.e., they are rounded-off real values of n·sin$\alpha$ and n·cos$\alpha$.

Although this integer type can be expected to provide fast processing, straight lines of the rotated image may be notched, and the rotated image may be less fine in resolution of such lines than desired for a particular application.

In order to prevent this, an interpolation method is provided. In this method, the real values of CS(n), SN(n) are stored in the tables without rounding off. Then the original address Q is not placed on the lattice. As shown in FIG. 9, four points Z1 through Z4 which are adjacent to the original address Q are obtained. Then the image data at the address Q is calculated in accordance with the image data of the four points Z1 through Z4 using an interpolation equation as follows:

$$N(Q) = S1N(Z1) + S2N(Z2) + S3N(Z3) + S4N(Z4)$$

where S1 through S4 stand for squares of four rectangles which have the same corner point Q and respectively have the corner points Z4, Z3, Z2 and Z1. The pitch of the corner points is 1. Therefore, $$S1 + S2 + S3 + S4 = 1$$

N(Zn) stands for the image data of the point Zn.

Thus, using the interpolation method, the rotated image should be a high quality image. Replacing the steps S04 and S13 of the flow charts in FIG. 6 and FIG. 8 with the interpolation method, rotation processing using the interpolation method can be carried out.

Further, the OFX1(n) and OFY2(n) are equal to input value or table value, and therefore these values need not be stored in the look up table.

As mentioned above, by using this embodiment, it takes only a short time to parallel-shift the original image and to rotate the original image by the rotation angle $\alpha$. The parallel-shifted and rotated image can be obtained very fast.

Second Embodiment (FIGS. 10 to 16)

The second embodiment discloses an example of the slantwise mapping.

Figure 10:
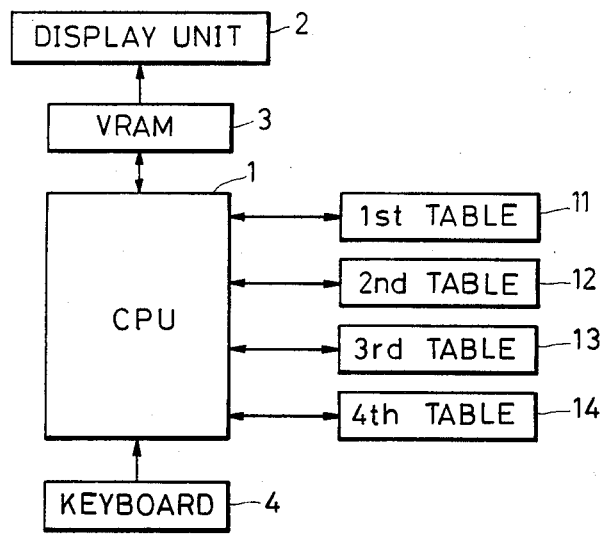
FIG. 10 is a block diagram of the second embodiment of the invention.

FIG. 10 is a block diagram showing the second embodiment of the present invention.

This embodiment comprises a CPU (Central Processing Unit) 1, a display unit 2, a VRAM (Video Random Access Memory) 3, a first look up table 11, a second look-up table 12, a third look-up table 13 and a fourth look-up table 14. The CPU 1 controls all systems totally. The VRAM 3 temporally stores an image data which is displayed by the display unit 2. The key board 4 is an example of an input means used to designate an area of an original image and an area of a modified copy image.

The first look up table 11 stores first destination addresses which represent points on a first side of a parallelogram of the modified copy image. The second table 12 stores second destination addresses representing points on one cross side (i.e., a side adjacent to the first side) of the parallelogram. The third table 13 stores first variables of a first numerical formula which provides original image addresses corresponding to destination addresses in accordance with a ratio of a length between an intersection point of the first side and the cross side and a predetermined point on the first side to a length of the first side. The fourth table 14 stores second variables of a second numerical formula which provides original image addresses corresponding to destination addresses in accordance with a ratio of a length between the intersection point and a predetermined point on the one cross side to the length of the one cross side.

The CPU 1 also obtains original addresses corresponding to all points of coordinates of destination image by referring to tables 11 to 14.

The operation of the embodiment will be described below.

Figure 11:
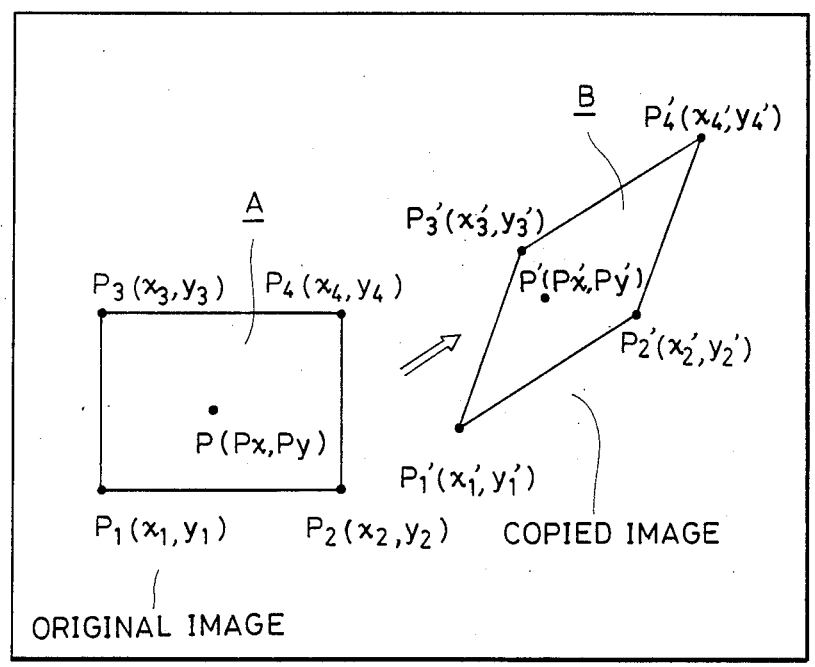
FIG. 11 is a drawing for explaining processing involved in a slantwise mapping.

FIG. 11 is a drawing showing the original image A and the modified copied image B or slantwise mapped image.

The original image A is an image surrounded by a rectangle and the modified copied image B is an image surrounded by a parallelogram having no right angle.

Figure 12:
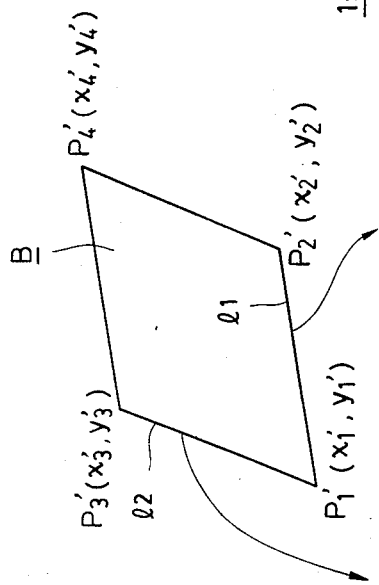
FIG. 12 is a chart illustrating contents of a first and a second table.
Figure 13:
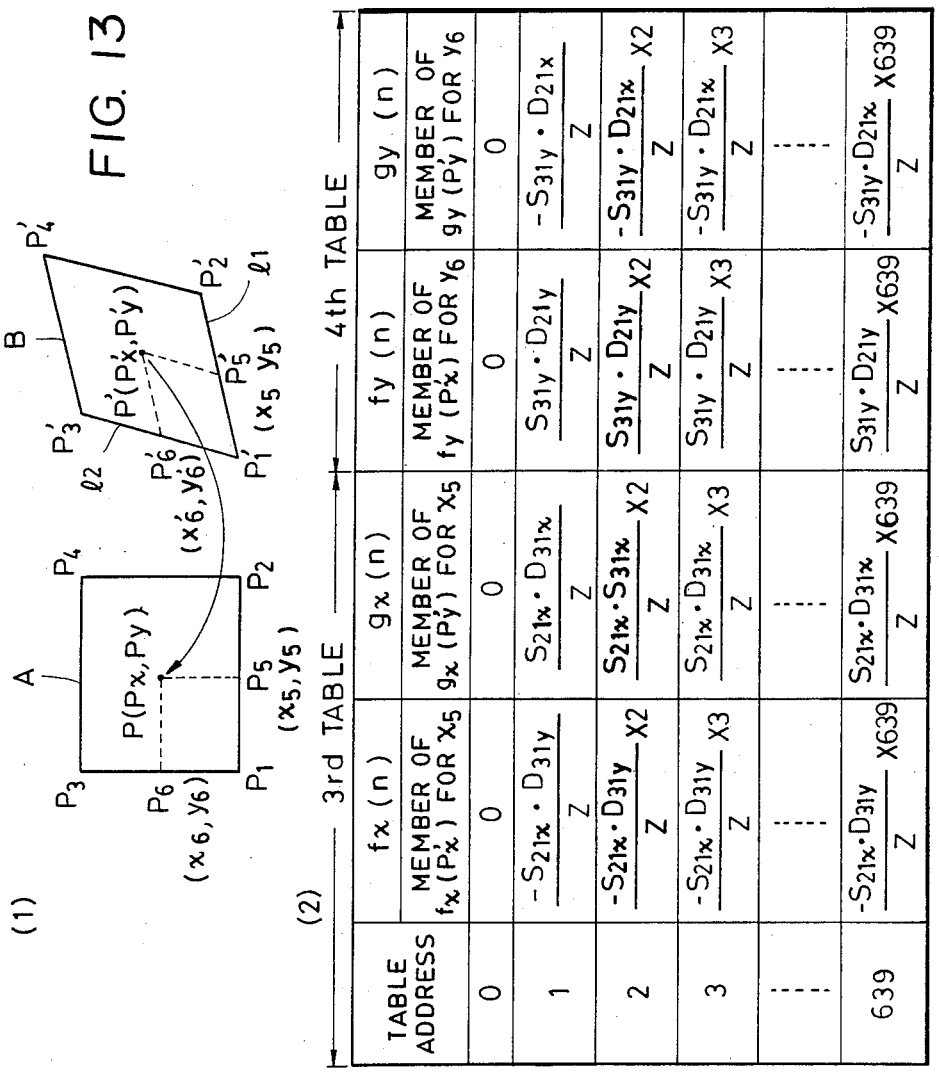
FIG. 13(1) is a drawing illustrating relationship between a point P' in a copied area B and a point P in an original area A.

The modified copied image B is obtained from the original image A by referring to the first table and the second table shown in FIG. 12, and the third table and the fourth table shown in FIG. 13, and by calculating addresses using the values in the first to fourth tables.

FIG. 12 shows the modified image B surrounding by the parallelogram, the contents of the first table which stores the addresses representing the points on the one side 11 of the parallelogram, and the contents of the second table which stores the addresses representing the points on the one cross side 12 crossing the one side 11. The one side 11 and the one cross side 12 have predetermined angles respectively. Therefore calculations of addresses are necessary to specify the points on sides 11 and 12.

The calculations of addresses are performed as follows. First, the first side 11 is written as follows:

$$y - y_1' = \frac{y_2' - y_1'}{x_2' - x_1'}(x - x_1') \tag{11}$$

And the one cross side 12 is written as follows:

$$y - y_1' = \frac{y_3' - y_1'}{x_3' - x_1'}(x - x_1') \tag{12}$$

Equations (11) and (12) involve multiplications and divisions. Therefore, it takes a long time to calculate the addresses of the points on sides 11 and 12.

However, the present invention solves this problem. Equation (11) can be rewritten as follows:

$$y = \frac{y_2' - y_1'}{x_2' - x_1'} \cdot x + y_1' - \frac{y_2' - y_1'}{x_2' - x_1'} \cdot x_1' \tag{13}$$

$$= OFY1(x) + C1$$

where OFY1(x) is an amount of the varying in the y direction relative to the varying of the x value. C1 is a constant. Namely, $$OFY1(x) = \frac{y_2' - y_1'}{x_2' - x_1'} \cdot x$$

$$C1 = y_1' - \frac{y_2' - y_1'}{x_2' - x_1'} \cdot x_1'$$

On the other hand, equation (12) can be rewritten as follows:

$$x = \frac{x_3' - x_1'}{y_3' - y_1'} \cdot y + x_1' - \frac{x_3' - x_1'}{y_3' - y_1'} \cdot y_1' \tag{14}$$

$$= OFX2(y) + C2$$

where OFX2(y) is an amount of the varying in the $\alpha$ direction to the varying of the y value, and C2 is a constant. Namely, $$OFX2(y) = \frac{x_3' - x_1'}{y_3' - y_1'} \cdot y$$

$$C2 = x_1' - \frac{x_3' - x_1'}{y_3' - y_1'} \cdot y_1'$$

Thus, the addresses on sides 11 and 12 can be obtained by table looking-up and adding.

The first table shown in FIG. 12 is provided for calculating the addresses on side 11. The amount of varying in the $\alpha$ direction is larger than that in the y direction, so that the address in the $\alpha$ direction is incremented. The first table stores the amount of varying in the y direction OFY1(x) corresponding to the amount of varying in the $\alpha$ direction $(x - x_1')$.

On the other hand, the second table shown in FIG. 13, is provided for obtaining the addresses on side 12. The amount of varying in the y direction is larger than that in the $\alpha$ direction, so that the address in the y direction is incremented. The second table stores the amount of varying in the $\alpha$ direction OFX2(y) corresponding to the amount of varying in the y direction $(y - y_1')$.

"OF" in "OFX2" and "OFY1" means the amount of offset value.

According to equation (13) and (14), the maximum values and minimum values of $\alpha$ and y in the region B are obtained and are stored in the tables in FIG. 12.

Side 11 is parallel-shifted along the side 12 by uniform increments of a predetermined amount. As the result, every address point in the region B can be generated.

Figure 15:
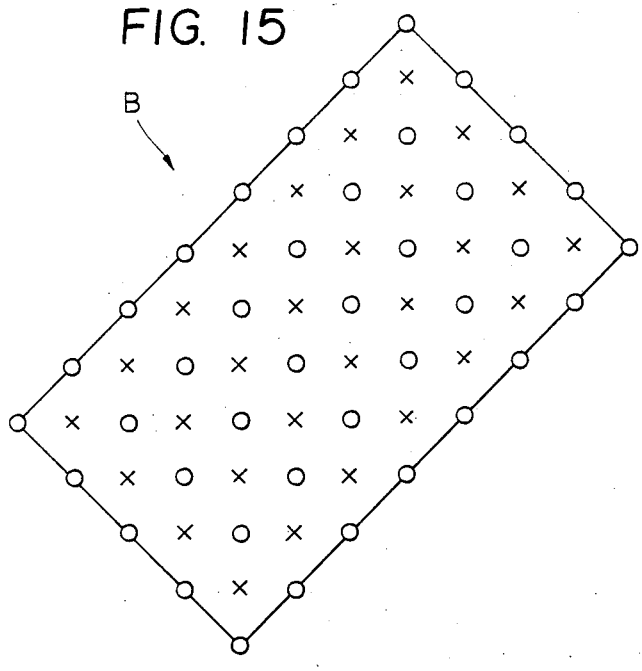
FIG. 15 is a drawing for explaining generation of lacking pixels.
Figure 16:
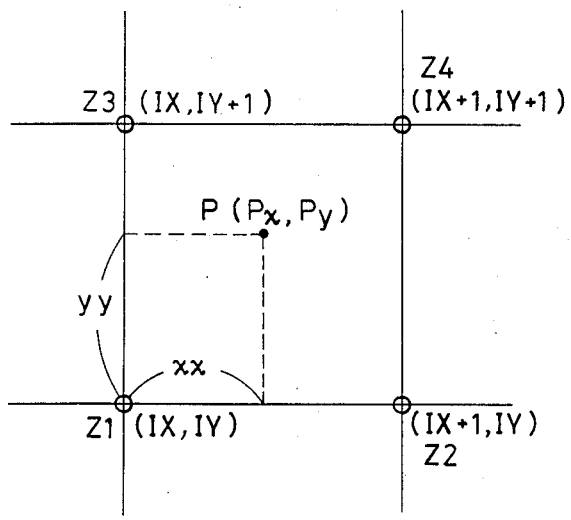
FIG. 16 is a drawing for explaining an example of an interpolation method.

It should be noted that when the sum of the absolute value of the amount of varying in the $\alpha$ direction and that in the y direction is two, the address points shown as "x" in FIG. 15 are lacking in the region B. In order to prevent occurrence of such lacking address points, one should proceed as follows. Whenever the address value in the $\alpha$ direction is varied by 1, the address point is generated while the address value in the y direction is still as it was previously. Then the address value in the y direction is varied by 1. These operations are repeated to generate the address point(s) shown as "x" in FIG. 15.

Now, the original image A has four cornerpoints P1, P2, P3 and P4. The copied parallelogram image B has also four cornerpoints P1', P2', P3' and P4' corresponding to the cornerpoints P1, P2, P3 and P4. The address point P(Px, Py) in the original image A corresponds to the address point P' (Px', Py') in the copied image B.

As shown in FIG. 13, a perpendicular line from the point P crosses the base P1P2 at a point P5($x_5$, $y_5$). A level line through the point P crosses side P3P1 at a point P6($x_6$, $y_6$). Points P5 and P6 correspond to points P5' ($x_5'$, $y_5'$) and P6' ($x_6'$, $y_6'$) in the copied image B.

Point P(Px, Py) is obtained by using points P2 through P6 and P1' through P6'.

In this case, an original x address Px of point Px is calculated by using the equation of line P'P'5, that of line P1'P2' and a proportional relationship of the ratio between the length of side P1P2 to that of (Px−x$_1$) and the ratio of the length of side P1′P2′ to that of line P1′P5′.

On the other hand, the original y address Py of the point P is calculated by using the equation of line P′P6′, that of line P1′P3′, and a proportional relationship of the ratio between the length of (Py−y$_1$) to that of side P1P3 and the length of (y$_6$′−y$_1$′) to that of side P1′P3′.

The point P5′ is a cross point of line P′P5′ parallel to side 12 (P1′P3′) and line P1′P2′ (side 11).

Therefore, line P′P5 can be written as follows:

$$y - Py' = \frac{y_3' - y_1'}{x_3' - x_1'} \cdot (x - Px') \tag{15}$$

Similarly, the line P1′P2′ can be written as follows:

$$y - y_1' = \frac{y_2' - y_1'}{x_2' - x_1'} \cdot (x - x_1') \tag{16}$$

Therefore, the x address x$_5$′ of the point P5′ can be written using equations (15) and (16) as follows:

$$x_5' = \tag{17}$$

$$\frac{\left\{\left(y_1' - Py' + x_1' \cdot \frac{y_2' - y_1'}{x_2' - x_1'} - Px' \cdot \frac{y_3' - y_1'}{x_3' - x_1'}\right)\right\}}{\left(\frac{y_3' - y_1'}{x_3' - x_1'} - \frac{y_2' - y_1'}{x_2' - x_1'}\right)}$$

Further, the point P in the area A and the point P5′ in the area B have the following proportional relationship:

$$\frac{Px - x_1}{x_2 - x_1} = \frac{x_5' - x_1'}{x_2' - x_1'}$$

Therefore, $$Px = x_1 + \frac{x_2 - x_1}{x_2' - x_1'} \cdot (x_5' - x_1) \tag{18}$$

Equation (17) is applied to the equation (18), resulting in the following:

$$Px = -\frac{S_{21x} - D_{31y}}{Z} \cdot Px' + \frac{S_{21x} - D_{31x}}{Z} \cdot Py' + x_1 +$$

$$\frac{S_{21x}}{Z}(D_{31y} \cdot x_1' - D_{31x} \cdot y_1')$$

where
S$_{21x}$=x$_2$−x$_1$
S$_{31y}$=y$_3$−y$_1$
D$_{21x}$=x$_2$′−x$_1$′
D$_{21y}$=y$_2$′−y$_1$′
D$_{31x}$=x$_3$′−x$_1$′
D$_{31y}$=y$_3$′−y$_1$′
Z=D$_{21y}$·D$_{31x}$−D$_{21x}$·D$_{31y}$ On the other hand, point P6′ is a cross point of line P′P6′ parallel to the side 11 (P1′P2′) and line P1′P3′ (side 12).

Therefore, line P′P6 can be written as follows:

$$x - Px' = \frac{x_2' - x_1'}{y_2' - y_1'} \cdot (y - Py') \tag{20}$$

Similarly, line P1′P3′ can be written as follows.

$$x - x_1' = \frac{x_3' - x_1'}{y_3' - y_1'} \cdot (y - y_1') \tag{20}$$

Therefore the y address y$_6$′ of point P6′ can be written using equations (20) and (21) as follows:

$$y_6' = \tag{22}$$

$$\frac{\left\{(x_1' - Px') + y_1' \cdot \frac{x_3' - x_1'}{y_3' - y_1'} - Py' \cdot \frac{x_2' - x_1'}{y_2' - y_1'}\right\}}{\left(\frac{x_2' - x_1'}{y_2' - y_1'} - \frac{x_3' - x_1'}{y_3' - y_1'}\right)}$$

Further, point P in the area A and point P6′ in the area B have the following proportional relationship:

$$\frac{Py - y_1}{y_3 - y_1} = \frac{y_6' - y_1'}{y_3' - y_1'}$$

Therefore, $$Py = y_1 + \frac{y_3 - y_1}{y_3' - y_1'} \cdot (y_6' - y_1') \tag{23}$$

Equation (22) is applied to equation (23), resulting in the following equation:

$$f_x(n) = -\frac{S_{21x} \cdot D_{31y}}{Z} \cdot n$$

$$f_y(n) = \frac{S_{31y} \cdot D_{21y}}{Z} \cdot n$$

$$g_x(n) = \frac{S_{21x} \cdot D_{32x}}{Z} \cdot n$$

$$g_y(n) = -\frac{S_{31y} \cdot D_{21x}}{Z} \cdot n$$

$$Cx = x_1 + \frac{S_{21x}}{Z}(D_{31y} \cdot x_1' - D_{31x} \cdot y_1')$$

$$Cy = y_1 - \frac{S_{31x}}{Z}(D_{21y} \cdot x_1' - D_{21x} \cdot y_1')$$

Equations (23) and (24) can be rewritten as follows:

$$Px = f_x(Px') - g_x(Py') + Cx \tag{25}$$

$$Py = f_y(Px') + g_y(Py') + Cy \tag{26}$$

where $$Py = \frac{S_{31y} \cdot D_{21y}}{Z} \cdot Px' - \frac{S_{31x} \cdot D_{21x}}{Z} \cdot Py' + y_1 -$$

$$\frac{S_{31y}}{Z}(D_{21y} \cdot x_1' - D_{21x} \cdot y_1')$$

Therefore, the address point P of the original image A can be obtained from the address point P of the copied image B, by using only look up tables (the third table 13 and the fourth table 14) and adders, without using multiplying and dividing operations shown in equations (25) and (26).

In the right side of equation (25), the first and the second terms are variables, while the third and other terms are constants. Thus, the first and the second terms could be stored in the third table shown in FIG. 13(2).

Similarly, in the right side of equation (26), the first and the second terms are variables, and the rest are constants. Therefore, the first and the second terms can be stored in the fourth table shown in FIG. 13(2).

As described above, the address point P can be obtained by using only looking up values in the third and the fourth tables and by adding. Therefore, the address point P can be obtained very fast. The time needed to calculate equations (25) and (26) is that required for four adding operations.

On the other hand, equations (23) and (24) have eleven adding and reducing operations and ten or more multiplications and divisions. The time needed to perform a multiplying or dividing operation is ten times more than what is needed to perform an adding or reducing operation.

Therefore, the time needed to calculate each of equations (23) and (24) is about 111 ($=10\times10+11$) times what is required to perform an adding or reducing operation. As the result, the time needed to calculate equations (25) and (26) is about one 30th (111/4) less than that needed to calculate equations (23) and (24). Calculations of integer type are faster than those of real type.

It should be noted that time for two multiplying and dividing operations and four adding and reducing operations is required to calculate each of equations (11) and (12). On the other hand, it takes two adding operations and two look-ups in the look-up tables to calculate each of equations (13) and (14). Therefore, it takes about $(2\times10+4)/(2\times2)$ times more time to calculate equations (11) and (12) than to calculate equations (13) and (14).

As a result, the time needed to calculate equations (11), (12), (23) and (24) is about 180 ($6\times30$) times more than to calculate equations (13), (14), (25) and (26).

The detailed operations are described as follows.

Figure 14:
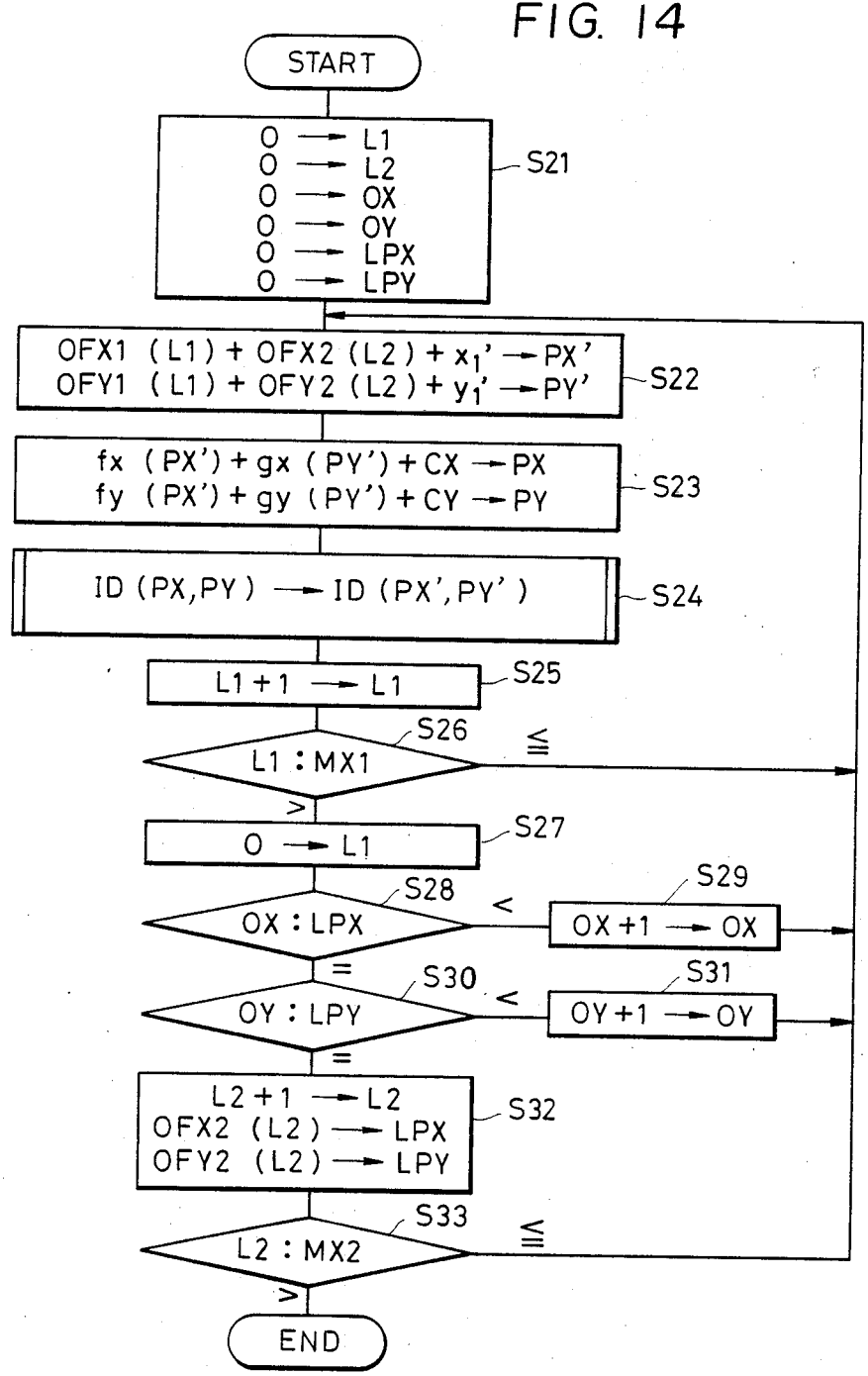
FIG. 14 is a flow chart illustrating procedures of controlling in the second embodiment.

FIG. 14 is a flow chart illustrating the operations of this embodiment, and instructions shown in FIG. 14 are stored in the read only memory in the CPU 1 shown in FIG. 10.

First, in step S21, every parameter is reset or initialized to 0. A parameter L1 stands for an amount of advance on side 11. A parameter L2 stands for an amount of advance on side L2. A parameter OX stands for an amount of advance along the x axis. A parameter OY stands for an amount of advance along the y axis. A parameter LPX stands for the maximum value of the amount of advance along the x axis. A parameter LPY stands for the maximum value of the amount of advance along the y axis. These parameters are operated as loop counters for counting time of processing for a line. Next, the addresses (Px', Py') of the line between points P1' and P2' (at side 11) are obtained from P1' (S22). Then the addresses (Px, Py) of the original image A, which correspond to the addresses (Px', Py') of the copied image B, are obtained by using looking-up tables and adding (S23).

For example, the address P1' (Px1', Py1') is obtained. Now OFX1 (L1), OFX2 (L2), OFY1 (L1) and OFY2 (L2) are stored in the first and second tables as shown in FIG. 12. L1 and L2 are 0 at the address P1' (Px1', Py1'), so that OFX1 (0), OFX2 (0), OFY1 (0) and OFY2 (0) are all 0. Therefore, (Px1', Py1') is obtained as (x1', y1') by means of equations (13) and (14). Then the address P1 (x1, y1) is obtained in accordance with P1' (x1', y1') by using the equations (25) and (26) in step S14. Next, in step S24, image data of the address point Px' (Px, Py) is transferred or is copied to the output address. Then in steps S25 and S26, the operations S22, S23 and S24 are repeated for all points on the line between points P1' and P2' (side 11).

In step S27, L1 is reset to 0. In this case, OX, OY, LPX and LPY are still 0. Therefore the program is advanced to step S32. In step S32, a reference point is shifted from point P1' to another point which is adjacent to point P1' on side 12 (line P1'P3'). Then the operations S22, S23 and S24 are repeated while the reference point is gradually shifted to the point P3' along side 12.

As mentioned above and shown in FIG. 15, as the address point is shifted in both the $\alpha$ and the y directions in increments of 1, some points or lines may be lacking from the final result. In order to prevent such occurrence, the parameters OX and OY are provided as loop counters which count times of sub loop S22 through S26 for a given line. Namely, in step S32, parameters LPX and LPY are set, the sub loop S22 through S26 is repeated a plurality of times (two times) until LPX and LPY respectively equal OX and OY, and OX and OY are incremented individually (S28, S29, S30 and S31).

The above-described operations are repeated until the reference point reaches point P3 (S33).

In the flow chart in FIG. 14 and in the above description, Fx(n), Fy(n), Gx(n), Gy(n), Cx and Cy are assumed to be integers. However, these variables and constants could be given non-integral (their actual) values. Therefore, the obtained addresses (Px, Py) are not always lattice points where image data actually exists. Then the obtained addresses (Px, Py) are in the square having four lattice points as shown in FIG. 7. In this case the image data IM (Px, PY) of the address point (Px, Py) is obtained by using an interpolation method as follows.

$$IM (Px, Py) = Z1 + XX \cdot (Z2 - Z1) + YY \cdot (Z3 - Z1) +$$
$$XX \cdot YY \cdot (Z4 + Z1 - Z2 - Z3)$$

where
$Z1 = IM (IX, IY)$
$Z2 = IM (IX + 1, IY)$
$Z3 = IM (IX, IY + 1)$
$Z4 = IM (IX + 1, IY + 1)$
$IX$ is the integer part of $Px$,
$IY$ is the integer part of $Py$,
$XX = Px - Ix$, and
$YY = Py - IY$.

Step S24 of the flow chart should be replaced with the above mentioned interpolation method if desired. If the interpolation method is used, the copied image should be a smooth image without notching.

In the above embodiment if the stored values Fx, Fy, Gx, Gy, Cx and Cy in the tables are set to be all integers, the copied image can be obtained very fast. If the stored values are set to be the actual (generally non-integral) ones, the copied image should be a high quality and smooth image.

OFX1, OFX2, OFY1 and OFY2 originally mean the addresses on the lattice; thus, the values of OFX1, OFX2, OFY1 and OFY2 are all integers. One of OFX1 and OFY1 and one of OFX2 and OFY2 must be varied in increments of one. Therefore the table for storing these values, and these values, can be dealt with as constants.

In the first and second embodiments, the processing is done by software of computer. However, if the adding and reducing circuits, etc., are implemented as hardware circuits, the processing can be carried out still faster.

In the first embodiment, the rotation of the image is done, and in the second embodiment, the slantwise mapping is done. However, the present invention can be applied as well to other processings or modifications, e.g., magnification (enlarging/reducing) or affine conversions.

According to the present invention, the modified image can be calculated by using simple calculations, so the modified image can be obtained very fast.

Although particular embodiments of the present invention are herein disclosed for purposes of explanation, various modifications thereof, after study of this specification, will be apparent to those skilled in the art to which the invention pertains.

What is claimed is:

1. An image processing apparatus for forming a modified image from an original image in a rectangular area, wherein the modified image is formed by means of slantwise-mapping the original image into a parallelogram area, comprising:

a first memory for storing data representing a plurality of points on two adjacent edges in the parallelogram area;

a second memory for storing data based on a ratio of lengths of two adjacent edges in the rectangular area to lengths of two adjacent edges in the parallelogram area associated with the two adjacent edges in the rectangular area;

a first calculator for calculating modified addresses of pixels within the parallelogram area in accordance with data read out from said first memory;

a second calculator for calculating original addresses of pixels within the rectangular area corresponding to the modified addresses calculated by said first calculator in accordance with data read out from said second memory; and transfer means for transferring image data stored in memory from the original addresses in memory calculated by said second calculator to the corresponding modified addresses in memory calculated by said first calculator.

2. An image processing apparatus according to claim 1, wherein said first calculator calculates the modified addresses without performing multiplication.

3. An image processing apparatus according to claim 1, wherein said second calculator calculates the modified addresses without performing multiplication.

4. An image processing apparatus according to claim 1, further comprising a third memory for storing image data of the original image.

5. An image processing apparatus according to claim 4, further comprising an additional memory for storing image data of the modified image.

6. An image processing apparatus according to claim 1, further comprising an additional memory for storing image data of the modified image.

7. An image processing apparatus according to claim 1, wherein said first memory stores addresses of a first side of the modified image, and addresses of a second side, adjacent to the first side, of the modified image.

8. An image processing apparatus for forming a rotated image from an original image, wherein the rotated image is formed by means of rotating the original image in a first rectangular area into a second rectangular area, comprising:

a first memory for storing data representing a plurality of points on two adjacent edges in the second rectangular area;

a second memory for storing data based on a rotation angle of the second rectangular area with respect to the first rectangular area;

a first calculator for calculating rotated addresses of pixels within the second rectangular area in accordance with data read out from said first memory;

a second calculator for calculating original addresses of pixels within the first rectangular area corresponding to the rotated addresses calculated by said first calculator in accordance with data read out from said second memory; and transfer means for transferring image data stored in memory from the original addresses in memory calculated by said second calculator to the corresponding rotated addresses in memory calculated by said first calculator.

9. An image processing apparatus according to claim 8, wherein said first calculator calculates the rotated addresses without performing multiplication.

10. An image processing apparatus according to claim 8, wherein said second calculator calculates the original addresses without performing multiplication.

11. An image processing apparatus according to claim 8, further comprising a third memory for storing the original image.

12. An image processing apparatus according to claim 11, further comprising an additional memory for storing the rotated image.

13. An image processing apparatus according to claim 8, further comprising an additional memory for storing the rotated image.

* * * * *

UNITED STATES PATENT AND TRADEMARK OFFICE
CERTIFICATE OF CORRECTION

PATENT NO. : 4,985,849
DATED : January 15, 1991
INVENTOR(S) : KAWAMURA HIDEAKI

It is certified that error appears in the above-identified patent and that said Letters Patent is hereby corrected as shown below:

In the Drawings:

SHEET 13 OF 13

Fig. 15, "LOOKING" should read --LACKING--.

COLUMN 1

Line 16, "simulataneously," should read --simultaneously.--.

COLUMN 4

Line 12, "may treated as be" should read
 --may be treated as--.
Line 56, "look up" should read --look-up--.

COLUMN 6

Line 45, "P" should read --P'--.

COLUMN 8

Line 35, "look up" should read --look-up--.
Line 57, "look up" should read --look-up--.

COLUMN 9

Line 5, "one" (second occurrence) should read --other--.
Line 12, "slantwise mapped" should read --slantwise-mapped--.

UNITED STATES PATENT AND TRADEMARK OFFICE
CERTIFICATE OF CORRECTION

PATENT NO. : 4,985,849
DATED : January 15, 1991
INVENTOR(S) : KAWAMURA HIDEAKI

Page 2 of 3

It is certified that error appears in the above-identified patent and that said Letters Patent is hereby corrected as shown below:

COLUMN 12

Line 35, insert:

$$-- Py = \frac{S_{31y} \cdot D_{21y}}{Z} \cdot Px' - \frac{S_{31x} \cdot D_{21x}}{Z} \cdot Py' + y_1 - \frac{S_{31y}}{Z}(D_{21y} \cdot x_1' - D_{21x} \cdot y_1')$$

Equations (23) and (24) can be rewritten as follows:

$$Px = f_x(Px') - g_x(Py') + Cx \qquad (25)$$
$$Py = f_y(Px') + g_y(Py') + Cy \qquad (26)$$

where --.

Lines 51-64 should be deleted.
Line 66, "point P" should read --point P'--.
Line 67, "look up" should read --look-up--.

UNITED STATES PATENT AND TRADEMARK OFFICE
CERTIFICATE OF CORRECTION

PATENT NO. : 4,985,849
DATED : January 15, 1991
INVENTOR(S) : KAWAMURA HIDEAKI

It is certified that error appears in the above-identified patent and that said Letters Patent is hereby corrected as shown below:

COLUMN 14

Line 30, "point P3" should read --point P3'--.

Signed and Sealed this

Seventeenth Day of August, 1993

Attest:

BRUCE LEHMAN

Attesting Officer    Commissioner of Patents and Trademarks